United States Patent Office 3,676,189
Patented July 11, 1972

3,676,189
METHOD OF COATING A POLYOLEFIN OR POLYOLEFIN-COATED PAPER SHEET MATERIAL
Anthony Ian Woodward, Amersham, Angus John Challis Purdie, Maidenhead, and Anthony Paul Way, Chesham, England, assignors to Wiggins Teape Research & Development Limited, London, England
No Drawing. Filed Aug. 7, 1970, Ser. No. 62,160
Claims priority, application Great Britain, Aug. 22, 1969, 42,069/69
Int. Cl. G03c *1/86;* B44d *5/04*
U.S. Cl. 117—76 P                                            4 Claims

ABSTRACT OF THE DISCLOSURE

The invention concerns a polyolefin surface treated with a coating of an acidic composition which comprises aqueous silica sol, an acid stable water insoluble film forming material, surface agents to keep the film forming material as a stable suspension in the composition, and an acid. The composition is coated onto the polyolefin as an aqueous composition and dried. The treatment renders the polyolefin surface adherent to, for example, photograph emulsion, printing inks and adhesives.

---

This invention concerns coated paper products, coating processes and coating compositions. The invention relates at least in part to improvements in or modifications of the invention described and claimed in our U.S. Ser. No. 489,651, now Pat. 3,520,242.

It is well known that excellent photographic support materials can be produced by coating paper with polyolefin in order to render the paper impervious to water and to photographic processing solutions. However, the coated polyolefin provides an inert hydrophobic surface and this surface is unreceptive to many coating materials, including in particular radiation-sensitive photographic emulsions, unless specially treated. Several suitable methods of surface treatment are known. The method of surface treatment most commonly used is that described as follows:

A photographic support comprises a sheet of paper having an extruded polyolefin film on at least one surface, the extruded film being treated with an electrical discharge. The discharge renders the surface relatively hydrophilic resulting in good adhesion of a subsequently applied aqueous photographic emulsion. In cases where a photographic emulsion is applied, the surface treatment of the polyolefin is particularly critical because excellent wet, as well as dry adhesion must be achieved. This is because the material is rewetted during photographic processing when it is immersed in alkaline and acidic processing solutions. The usual experimental method for measuring the wet emulsion adhesion is described as follows:

A sample is coated with photographic emulsion, exposed to give maximum density and processed, and while wet two scratches are made at right angles to cut through the emulsion to the support layer. The cross is then rubbed with the finger to assess the amount of emulsion which can be removed. An arbitrary scale can be made, indicating by subjective assessment the amount of emulsion coat which can be removed. Thus a figure of 1 represents virtually no removal whereas a figure of 9 denotes practically no adhesion. When values of 1 to 3 are obtained in this adhesion test the adhesion is considered satisfactory.

An additional difficulty with coated polyolefin surfaces is that as well as being hydrophobic they are also non-absorptive, and thus printing and writing inks which require to be absorbed are not easily applied. Furthermore, radiation sensitive diazo solutions such as are used in photocopying methods require to be absorbed in the substrate to which they are applied, in order to achieve an adequate weight of coating. When these solutions are applied to an untreated polyolefin surface the maximum optical density of the final image which can be achieved is rather low. A further difficulty with polyolefin coated surfaces is that they will not readily accept pencil markings.

The electrical discharge treatment previously mentioned is known to be effective only when the photographic emulsion is coated within a few days of treatment. It has been found that the effect of the treatment decays with the passage of time, the rate of decay depending on factors such as the relative humidity and the ambient temperature. Sub coatings may be applied immediately after treatment in order to maintain the level of treatment over a long period of time. For example, such an antidecay coating comprises either gelatine or a silica sol, which may be applied immediately after discharge treatment. A further disadvantage of the electrical discharge treatment is that it presents a potential fire hazard if it is performed in the vicinity of organic solvents.

An additional disadvantage of the electrical discharge surface treatment method, is that it can often be the limiting factor governing the speed of extrusion coating of the polyolefin on to the paper. The discharge apparatus is normally placed just before the rewind stage of an extrusion coating machine, and in order to achieve the required degree of treatment, the coating plant may have to run at a slower speed than maximum, which results in a lower production rate.

The level of electrical discharge treatment may be determined by measuring the contact angle of a drop of water on the polyolefin surface. An untreated polyolefin surface has a contact angle in excess of 90°, and we have found that to achieve adequate emulsion adhesion a contact angle after treatment of less than 75° is necessary.

Other methods are known for rendering polyolefin surfaces receptive to coating materials such as aqueous photographic emulsions, which do not involve any pretreatment of the surface by electrical discharge, flame treatment or chemical priming. For example in U.S. Ser. No. 489,651 there is described and claimed a method of treating a sheet substrate material having a coating of an extruded polyolefin which method comprises applying to the polyolefin surface of the polyolefin coated sheet substrate material a coating of an acidic aqueous composition comprising an aqueous silica sol, an acid-stable, organic film forming material and an acid, and thereafter drying the product either at an elevated temperature, or at ambient temperature and subsequently heating the product, whereby the dried coating on the polyolefin surface possesses absorptive properties. The pH of the coating composition is usually between 2 and 7.

The acid-stable, organic film forming material constituents of the coating compositions specifically described in U.S. Ser. No. 489,651 are water soluble polymers. In order for such polymers to produce satisfactory coatings it is necessary for the coating compositions comprising them to be cured, for example by carrying out the drying stage at an elevated temperature, for example 50° C. or even higher, or, if the drying step is effected at ambient temperatures, by subsequently heating the coating for a short period. However, it will be appreciated that it would be desirable in certain cases if the heating step could be omitted, particularly where coating at high speed is desired, provided that the resulting coating would still possess satisfactory adhesion properties. We have now discovered a type of coating composition which enables this advantage to be obtained.

According to the present invention there is provided a method of treating a sheet substrate material consisting of, or having a coating of, a polyolefin which method comprises applying to the polyolefin surface of the polyolefin-surfaced sheet substrate material a coating of an acidic aqueous composition comprising an aqueous silica sol, an acid-stable, water-insoluble, film-forming material, an acid, and such surface active agents as are required to retain the water-insoluble organic polymeric in copolymeric film-forming material in stable suspension in the aqueous coating composition, and thereafter drying the product to produce a dried coating on the polyolefin surface which possesses absorptive or hydrophilic properties.

Also within the scope of this invention are coated products, particularly coated polyolefin-surfaced photographic paper products, whenever made by the above method.

Additionally the scope of this invention extends to acidic aqueous compositions comprising an aqueous silica sol, an acid-stable, water-insoluble, film-forming material, an acid, and such surface active agents as are required to retain the water-insoluble film-forming material in stable suspension.

Three examples of film-forming agents in accordance with this invention are as follows:

(1) Aqueous polyethylene emulsions, e.g. Bradsyn PC 12 (trade name, Hickson & Welch, Ltd.).

(2) Aqueous styrene/butadiene copolymer latexes e.g. Dow Latex 630 (trade name, Dow Chemical Co.).

(3) A polyvinyl alcohol which has been modified by an organic titanium ester e.g. Triethanolamine Titanate. An example of such a polyvinyl alcohol is Aloctex 8805, (trade name, Harlow Chemical Co.).

The pH of the coating composition should be between 2 and 7, the preferred range being 2 to 4.5.

It is not intended to restrict the use of these coating compositions to improving the adhesion of radiation-sensitive emulsions, or even to photographic support materials. In the photographic field these coatings may improve the absorption of diazo solutions or of printing and writing inks on to polyolefin coated paper. If a pigment or matting agent is employed these coatings may find use as a back writing coat. They may also find a use with non-photographic materials, either with supported or unsupported films where a coating is required which is either absorptive or hydrophilic. These coatings may also be used as a carrier medium for pigments, anti-static agents, optical brightening agents or any similar additive materials.

The general concentration range of the constituents are 1–809 solids by weight of aqueous silica sol and 0.01–40% solids suspension of a film-forming agent. However the preferred concentration range of the constituents are 5–50% silica sol, 0.1–15% film-forming agent, and a ratio of silica sol to film-forming agent of 2:1 or more. With many of these compositions it has been found advantageous to add a suitable wetting agent, for example Triton X–100 (trademark, Rohm & Haas Co.) which is an iso octyl phenoxy polyethoxyethanol. The wetting agent leads to improved coating properties of the compositions and in some cases leads to improved adhesion. The concentration of wetting agent must be carefully controlled since we have found that too large an addition leads to poor spreading of the aqueous photographic emulsion which is subsequently applied to the dry coating.

Although these compositions were primarily designed to be aqueous, part of the water may be replaced by an organic solvent in order to increase the rate of drying. Suitable solvents are the lower aliphatic alcohols (e.g. methanol) and the lower aliphatic ketone (e.g. actone).

The aqueous subbing compositions of this invention as exemplified herein show several advantages over the coating compositions specifically described in U.S. Ser. No. 489,651, apart from the fact that they do not require curing. In the case of coatings described in U.S. Ser. No. 489,651, the silica sol when acidified in the presence of polyvinyl alcohol tends to coagulate. This leads to a matt appearance when it is coated which is often undesirable, and also the silica particles tend to settle out when the mix is left to stand. Also, poor adhesion of the photographic emulsion can occur for this sub coat if the emulsion contains a gelatin hardening agent, for example formaldehyde. Subbing compositions based on gelatin can also be affected by formaldehyde which permeates through from the wet strength resins present in the paper base. This again leads to poor adhesion of the photographic emulsions.

We have found that with the aqueous subbing compositions specificially described herein the silica sol does not coagulate when the mix is acidified, and thus an excellent gloss is obtained when the mix is coated on the substrate. Also, the adhesion of the subsequently applied photographic emulsion is not affected by either gelatin hardening agents in a subsequently applied photographic emulsion or by formaldehyde from wet strength resins in the paper base.

The invention is illustrated by the following specific example:

EXAMPLE 1

To a roll of pigmented, glossy, polyethylene coated paper of total basis weight 260 g.s.m. was applied, using a reverse roll and air knife applicator, a 2 g.s.m. coating of a subbing mix of the following composition:

| | Ml. |
|---|---|
| Silica sol (3% solids) | 80 |
| Polyethylene emulsion (Bradsyn PC12) | 5 |
| Triton X–100 (5%) | 1 |
| Water | 35 | pH adjusted to 2.0 with nitric acid.

The paper was then coated with a silver halide photographic emulsion under the following three conditions of gelatin hardening: (1) no hardener (2) chrome alum (3) formaldehyde.

In each case the wet emulsion adhesion after processing was found to be good, even when the coatings were incubated for 1 week at 50° C. The gloss was also excellent in all cases.

EXAMPLE 2

A roll of paper, polyethylene coated on both sides with a total basis weight of 260 g./m.$^2$, was coated without prior corona discharge treatment with a subbing mix of the following composition:

| | Ml. |
|---|---|
| Silica sol (30% solids) | 80 |
| Styrene/butadiene copolymer (48% solids) | 3 |
| Triton X–100 (5% solution) | 4.5 |
| Water | 38 | pH adjusted to 2.0 with nitric acid.

The mix was coated by reverse roll and air knife applicator giving a dry coating weight of 5 g./m.$^2$ and was dried by high velocity air at 25° C.

The paper was then further coated with several types of silver halide photographic emulsion under the following three conditions of gelatin hardening: (1) no hardener, (2) chrome alum, (3) formaldehyde.

The wet emulsion adhesion after processing was found to be excellent, even when the coatings were incubated for 1 week at 50° C. The coating showed no photoactivity and the gloss was also good.

EXAMPLE 3

Glossy, polyethylene coated photographic paper with a total basis weight of 180 g./m.$^2$ was coated without corona discharge pretreatment in the same manner as Example 2. The coating mix composition was as follows:

|  | Ml. |
|---|---|
| Silica sol (30% solids) | 80 |
| Polyvinyl alcohol (2½% solids) | 10 |
| Triethanolamine titanate (5% solution) | 1 |
| Triton X-100 (5% solution) | 2 |
| Water | 30 | pH adjusted to 2.0 with nitric acid.

The coated paper was further coated with photographic emulsions and tested for wet adhesion in the same manner as Example 1. The coating was found to give good adhesion and gloss.

EXAMPLE 4

A polyethylene coated photographic base paper identical to that used in Example 2 was coated, by reverse roll and air knife application, with a 3 g./m.$^2$ coating of a mix of the following composition:

|  | Ml. |
|---|---|
| Silica sol (30% solids) | 160 |
| Polyethylene emulsion (25% solids) | 10 |
| Ethanol | 35 |
| Water | 35 | pH adjusted to 2.0 with nitric acid.

The addition of ethanol eliminated the need for a wetting agent and also reduced the drying time of the mix. The coating was dried with air at 20° C. and then emulsion coated as before. The wet emulsion adhesion was found to be good.

EXAMPLE 5

A polyethylene coated paper identical to that used in Example 2 was coated using a Meyer rod doctor with a 5 g./m.$^2$ coating of a mix of the following composition:

|  | Ml. |
|---|---|
| Silica sol (30% solids) | 80 |
| Styrene/butadiene copolymer (48% solids) | 1 | pH adjusted to 4.5 with nitric acid.

The coating was air dried at room temperature and tested for emulsion adhesion in the same way as before. The wet adhesion and gloss were found to be excellent.

We claim:
1. A method of treating a polyolefin, or polyolefin-coated paper, sheet material, which method comprises the following steps:
   (a) applying to the polyolefin or polyolefin coating an acidic aqueous composition containing,
      (i) from 1 to 80% solids by weight of an aqueous silica sol;
      (ii) from 0.01 to 40% solids suspension by weight weight of an acid-stable water-insoluble organic polymeric film-forming material selected from the group consisting of an aqueous polyethylene emulsion, an aqueous styrene/butadiene copolymer latex, and a polyvinyl alcohol modified by an organic titanium ester;
      (iii) a non-polymeric acid to give the composition a pH of between about 2 and 7; and
      (iv) sufficient surface-active agents to retain the water-insoluble organic polymeric film-forming material in stable suspension in the acidic aqueous composition; and
   (b) drying the composition at a temperature of less than 25° C. to produce a dried coating which possesses absorptive or hydrophilic properties.

2. A method as claimed in claim 1, wherein the organic titanium ester is triethanolamine titanate.

3. A method as claimed in claim 1, wherein the acidic aqueous composition additionally contains:
   (a) one or more additives in the form of pigments, antistatic agents or optical brightening agents; and
   (b) an organic solvent selected from the group consisting of lower aliphatic alcohols and lower aliphatic ketones.

4. A method of treating a polyolefin, or polyolefin-coated paper, sheet material, which method comprises the following steps;
   (a) applying to the polyolefin or polyolefin coating an acidic aqueous composition containing:
      (i) from 5 to 50% solids by weight of an aqueous silica sol;
      (ii) from 0.1 and 15% solids suspension by weight of an acid-stable water-insoluble organic polymeric film-forming material selected from the group consisting of an aqueous polyethylene emulsion, an aqueous styrene/butadiene copolymer latex, and polyvinyl alcohol modified by triethanolamine titanate;
      (iii) a non-polymeric acid to give the composition a pH of between about 2 and 4; and
      (iv) sufficient iso octyl phenoxy polyethoxyethanol surface-active agent to retain the water-insoluble organic polymeric film-forming material in stable suspension in the acidic aqueous composition; and
   (b) drying the composition at a temperature of less than 25° C. to produce a dried coating which possesses absorptive or hydrophilic properties.

References Cited

UNITED STATES PATENTS

| 3,520,242 | 7/1970 | Kemp et al. | 117—76 P X |
| 3,161,519 | 12/1964 | Alsup | 117—76 P X |
| 2,805,159 | 9/1957 | Unkauf | 96—75 |
| 3,231,411 | 1/1966 | Tyler et al. | 117—76 P |
| 3,380,824 | 4/1968 | Bach | 96—75 X |

OTHER REFERENCES

T873,009 Defensive Publication, Campbell et al., Apr. 14, 1970.

RALPH HUSACK, Primary Examiner

U.S. Cl. X.R.

96—85, 87 R; 117—138.8 E